United States Patent
Pawar et al.

(10) Patent No.: US 11,681,842 B2
(45) Date of Patent: Jun. 20, 2023

(54) LATENCY OFFSET IN PRE-CLOCK TREE SYNTHESIS MODELING

(71) Applicant: Synopsys, Inc., Mountain View, CA (US)

(72) Inventors: Kailash Pawar, San Jose, CA (US); Paul Eugene Richard Lippens, Eindhoven (NL); Darren Charles Cronquist, San Francisco, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/643,359

(22) Filed: Dec. 8, 2021

(65) Prior Publication Data
US 2022/0180031 A1    Jun. 9, 2022

Related U.S. Application Data

(60) Provisional application No. 63/122,816, filed on Dec. 8, 2020.

(51) Int. Cl.
*G06F 30/32* (2020.01)
*G06F 111/04* (2020.01)

(52) U.S. Cl.
CPC .......... *G06F 30/32* (2020.01); *G06F 2111/04* (2020.01)

(58) Field of Classification Search
CPC .. G06F 30/32; G06F 2111/04; G06F 2119/12; G06F 30/396
See application file for complete search history.

(56) References Cited

U.S. PATENT DOCUMENTS

| | | | |
|---|---|---|---|
| 9,135,375 B1* | 9/2015 | Sood | G06F 30/00 |
| 9,672,305 B1* | 6/2017 | Vats | G06F 30/327 |
| 10,248,746 B1* | 4/2019 | Bisht | G06F 30/33 |
| 2007/0006105 A1* | 1/2007 | Bartling | G06F 30/30 716/108 |
| 2010/0070941 A1* | 3/2010 | Sircar | G06F 30/327 716/113 |
| 2011/0050307 A1* | 3/2011 | Lin | H03K 5/133 327/175 |
| 2012/0095746 A1* | 4/2012 | Rao | G06F 30/3312 703/14 |
| 2018/0231604 A1* | 8/2018 | Kim | G06F 30/34 |
| 2019/0332934 A1* | 10/2019 | Han | G06N 3/08 |
| 2020/0401669 A1* | 12/2020 | Gupta | G06F 30/327 |

\* cited by examiner

*Primary Examiner* — Nha T Nguyen (74) *Attorney, Agent, or Firm* — Patterson + Sherdan, LLP (57) ABSTRACT

Embodiments herein include detecting a transformation in a circuit layout before clock tree synthesis is performed, and in response, estimating a latency offset, relative to a global latency value, for a clock pin in a clock gate circuit. Moreover, the embodiments includes determining, based on the latency offset, a timing constraint for combinational logic configured to generate an enable signal for the clock gate circuit and adjusting the circuit layout based on the timing constraint to affect when the combinational logic generates the enable signal.

20 Claims, 7 Drawing Sheets

LATENCY OFFSET IN PRE-CLOCK TREE SYNTHESIS MODELING

CROSS-REFERENCE TO RELATED APPLICATIONS

This application claims priority to and the benefit of U.S. Provisional Patent Application Ser. No. 63/122,816, entitled "Latency Offsets in Pre-Clock Tree Synthesis Modeling", filed Dec. 8, 2020, which is incorporated herein by reference in its entirety.

TECHNICAL FIELD

The present disclosure relates to the field of electronics in general, including cell-based design. More particularly, the present disclosure provides for individualized timing estimation and offsetting prior to Clock Tree Synthesis (CTS) in the design of digital chips and integrated circuits.

BACKGROUND

In most modern circuit design, the physical design and simulation of the circuits includes several steps where various circuit elements are placed at locations relative to one another and wires/connections are routed between those elements to connect the various circuit elements. Designers define and specify various constraints to improve performance, power and the area of a chip (among other objectives) by guiding the tool through how to place, route and optimize the design to achieve an intended goal.

Various software packages take these constraints and objectives to attempt to layout the various elements to prioritize one or more constraints/objectives (sometimes at the expense of violating another constraint or a value of that constraint for a given element), which is often referred to as "optimizing" the layout for those constraints and objectives. As used in the art, and as understood by a person having ordinary skill in the art, "optimization", "optimize", "optimizing", and variants thereof, refer to a mathematical formulation of a problem to select some improvement (if an improvement is available) of some identified characteristic or constraint, and does not imply an absolute or global optimal improvement of the characteristic or constraint (as the term may be more colloquially used). Accordingly, in some situations optimization may determine a minimum, where the minimum may be a local minimum rather than the global minimum. For example, a first design optimized for reduced wire length may consume more power than a second design optimized for low power consumption. In another example, a first design optimized for reduced wire length may have a lower total wire length over the entirety of the circuit than a second design, but may also have a longer individual wire length between a first element and a second element than in the second design. Accordingly, an "optimized" layout is created or updated to improve the overall metric for one or more actively specified constraints and/or objectives, and may represent several layered design considerations in various priorities of optimization.

During design and optimization, several tasks are performed iteratively—potentially re-locating or re-specifying the circuit elements to improve overall performance for the optimized constraint(s) and objectives. Because the drive strengths and distances between the various elements in the circuit are unknown or can change before CTS, the timing of clock signals is idealized until CTS is performed. As used herein, an "ideal" clock signal refers to the status where all clock signals in a clock domain are delivered at the same time (factoring in clock skew constraints, if any). This idealization happens for clock signals that form the global synchronization signals for designs with clocked elements (such as gating-cells, registers and latches).

During the pre-CTS stages of the flow, idealized clock signals are used so that the design tool uses the same global clock latency (i.e., the time taken by a clock-signal to reach a pin from a clock source, which is specified in the form of clock constraints) for both sink pins (e.g., flip-flop clock pins) and clock gate pins (i.e., the inputs/connections that receive the clock signals). This latency is typically an empirical user-specified value that estimates the post-CTS clock insertion-delay and is evenly applied to all traces between circuit elements of the clock network. In the non-idealized implementation, the clock signal needs to arrive earlier at the clock gate pins compared to the downstream clock sink pins to satisfy the causal relation between clock latency at the clock gate and clock latency at clock sinks downstream of the clock gate. Accordingly, timing paths that end at clock gate cells (e.g., enable-timing paths that are evaluated against clock arrival (clock-latency) at the clock gate's clock pin) can suffer from overly optimistically set latency values used for idealized modeling, requiring a computationally expensive re-positioning, re specification, or both during CTS.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Embodiments of the present disclosure relate to effectively using a latency offset of a clock gate circuit for modeling the effect of CTS (Clock-Tree-Synthesis) while doing Static Timing Analysis (STA) during pre-CTS stages of the design-flow. In one embodiment, the present disclosure estimates (or predicts) a latency offset of a timing path of a clock gates in a pre-CTS stage. The clock gates (also referred to as integrated clock gates (ICG)) are generally used to gate or block a clock signal from reaching certain parts of the circuit design in order to save power. For example, if a register is not going to be written to in a subsequent clock cycle, a clock gate can be used to gate (or block) the clock signal from reaching that register, thereby avoid switching of the clock-signal, which results in power savings.

The clock gate includes at least two input pins in a netlist: a clock pin and an enable pin which determines whether the clock gate blocks the clock or permits the clock to propagate to downstream logic (e.g., a downstream register). During timing-analysis, for all the gating-cells, timing is analyzed for the enable pins against the clock pin of gating signals using the latency specified for it. For correct operation of the circuit, it is important that the signal arriving at the enable pin stabilizes before a change at the clock input of the gating cell (e.g., before a rising clock-edge or a falling clock-edge, depending on the clock gate type) which is determined using the latency defined/specified on the clock pin. The latency offset specified at the clock input of the clock gate constrains the signal arriving at the enable pin of the gating cells. For example, a shorter latency offset means combinational logic has less time to generate (e.g., stabilize) the enable signal for the clock gate so the gate can either block or pass the clock signal in the subsequent clock cycle. However, in pre-CTS stages, typically this latency offset is assigned the same global clock latency that estimates the post-CTS clock insertion-delay and is evenly applied to all traces between circuit elements of the clock network. Instead, in the embodiments herein, the latency offset for the clock gates is estimated or measured during pre-CTS stages which in turn can be used to derive a more accurate time constraint for the combinational logic used to provide the enable signal to the clock gate. Advantageously, identifying the latency offset for the clock pins of clock gates does not impact the clock latency (i.e., the global latency value) assigned to the other circuit elements in the circuit layout in the netlist. Unlike latency constraint which affects the whole fanout cone of a clock network from the pin where it is specified, the latency offset is specified and consumed only at specified pins, and nowhere else. Moreover, the optimizer typically has more options to optimize the combinational logic so it meets the timing constraint in the pre-CTS stages than in post-CTS.

The delay estimation and annotation of the latency offset can be performed multiple times in the pre-CTS stages of the flow, and every time a transformation is performed that could impact the estimation results of the latency offset, the delay estimation and annotation are updated. Examples of such transformations that affect the latency offset of clock gates are cell placement, multi-bit (un)packing of flip flops, "useful-skewing", and clock gate cloning/splitting.

The latency offsets are used by the STA tool to calculate the timing of the clock gate when enabling timing paths. As described in greater detail below, using a latency offset with the global timing constraint reduces the optimism/pessimism present in the idealized global latency constraint for associated circuit elements, and makes the evaluation of the clock gate when enabling timing paths more realistic. In this way, the correlation between pre-CTS and post-CTS clock gate enable path timing evaluation is improved significantly. Additional benefits of the present disclosure include, but are not limited to: the latency offset not propagating into fanouts of the endpoint to which it is applied, increased speed of estimation (i.e., reduced consumption of computing resources) due to the localized scope of the offset latencies, and compatibility with various user specified latencies.

Once the time constraint on the enable signal path (e.g., the combinational logic) is identified, the design tool can, during placement optimization, restructure the connection and placement of integrated clock gating cells and the registers that the clock drives to improve the clock-latency. Restructuring can include gating/ungating, ICG splitting, ICG merging, etc. This restructuring improves overall clock latency and hence timing of the design along with area usage of the components in the design layout.

Figure 1:
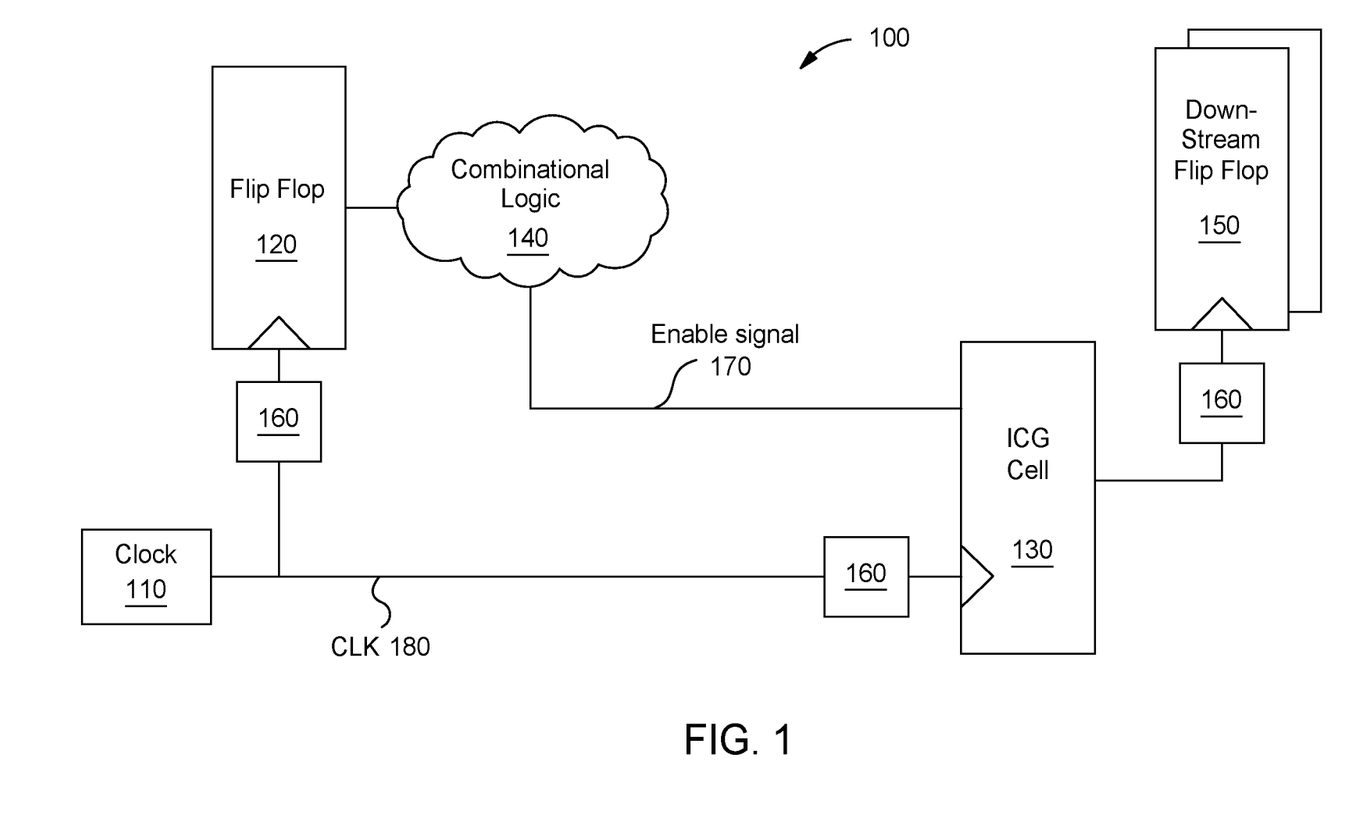
FIG. 1 illustrates an initial circuit layout, according to embodiments of the present disclosure

FIG. 1 illustrates an initial circuit layout 100, according to embodiments of the present disclosure. The initial circuit layout 100 includes a clock source 110 that drives the clock pins for a first flip-flop 120 and an ICG cell 130. The first flip-flop 120, which is a sequential element that is upstream from the ICG cell 130, provides output to combinational logic 140 that controls whether the ICG cell 130 (via an enable pin of the ICG cell 130) passes a clock signal (CLK) 180 generated by the clock source 110 to one or more downstream flip-flops 150a-n (generally or collectively, downstream flip-flops 150), thus controlling the activity of the downstream flip-flops 150 (and the associated timing and power consumption thereof) for power reduction, for example. That is, the ICG cell 130 either permits the CLK signal 180 to reach the downstream flip-flops 150 or blocks the CLK signal 180 depending on an enable signal 170 generated by the combinational logic 140.

Prior to CTS, clock signal propagation is considered as ideal where clock signals (e.g., a CLK signal 180 from the clock source 110 and the clock output from ICG 130) are assumed to arrive on time independently of processing or transmission delays. When the clock source 110 is in an ideal mode, the design tool uses or applies the same global latency value 160 for clock pins of the ICG cell 130 as for clock pins of registers (e.g., clock-sink pins) of the first flip-flop 120 and the downstream flip-flops 150. Even though the ICG cell 130 is placed in between the flip-flops 150 and the clock 110, during pre-CTS stages when the clocks are in the ideal mode, it is assumed the CLK signal 180 reaches the ICG cell 130 at the same time as the downstream flip-flop 150 (i.e., the same global latency value 160 is assigned to the clock pins of both the ICG cell 130 and the flip-flops 150). For example, a global latency value 160 of 100 ps (picoseconds) is selected and applied globally, such that a first latency between the clock source 110 and the first flip-flop 120, a second latency between the clock source 110 and the ICG cell 130, and a third latency between the clock source 110 (through the ICG cell 130) and the downstream flip-flops 150 are all idealized to 100 ps.

The global latency value 160 is a user (or system) specifiable clock-latency, and is optimistic with respect to the actual value that the elements will see when clocks are propagated (in a non-idealized mode) after CTS. The global latency value 160 assumes when the clock signal will arrive relative to other sinks. For example, depending on the location of the ICG cell 130 with respect to clock-sink pin within a design, optimism varies, such that an ICG cell 130 further from clock-sink pins show more optimism compared to those that are placed closer to the associated driven clock-sink pins.

Accordingly, physical placement of the ICG cell 130 affects enable-path timing of the ICG cell 130 from the combinational logic 140, which is not considered when in the ideal mode. In the absence of latency offset, these enable paths are evaluated against the clock-latency (i.e., the global latency value 160) as specified for the clock input pins of ICG cells by the design tool. But in reality, the combinational logic 140 may have a smaller time budget to provide the enable signal 170 at the ICG cell 130; however, this is not determined until after CTS where the design tool has fewer available optimization techniques to optimize the circuit so that the combinational logic 140 provides the enable signal 170 within the time budget. Thus, the embodiments herein attempt to provide a better measure of the clock-latency for the ICG cell 130 than the global clock latency 160 during pre-CTS stage which in turn results in a better knowledge of the time budget for the combinational logic 140 used to generate the enable signal 170.

Regarding how the latency offsets are calculated, clock arrival time at ICG clock input pins depends on clock-latency from the ICG cell's clock pin to the downstream flops 150 driven by the ICG cell 130. If downstream clock-latency is large, then the clock signal needs to arrive earlier at the clock input pin of an ICG cell as compared to a scenario where downstream latency is small. Hence well estimated clock-latency values help in timing correlation and convergence throughout the pre- and post-CTS design-flow stages.

The design tool discussed herein can perform some or all of the Electronic Design Automation processes 412 described in FIG. 4 below and can be executed using the computing system 500 described in FIG. 5.

Figure 2:
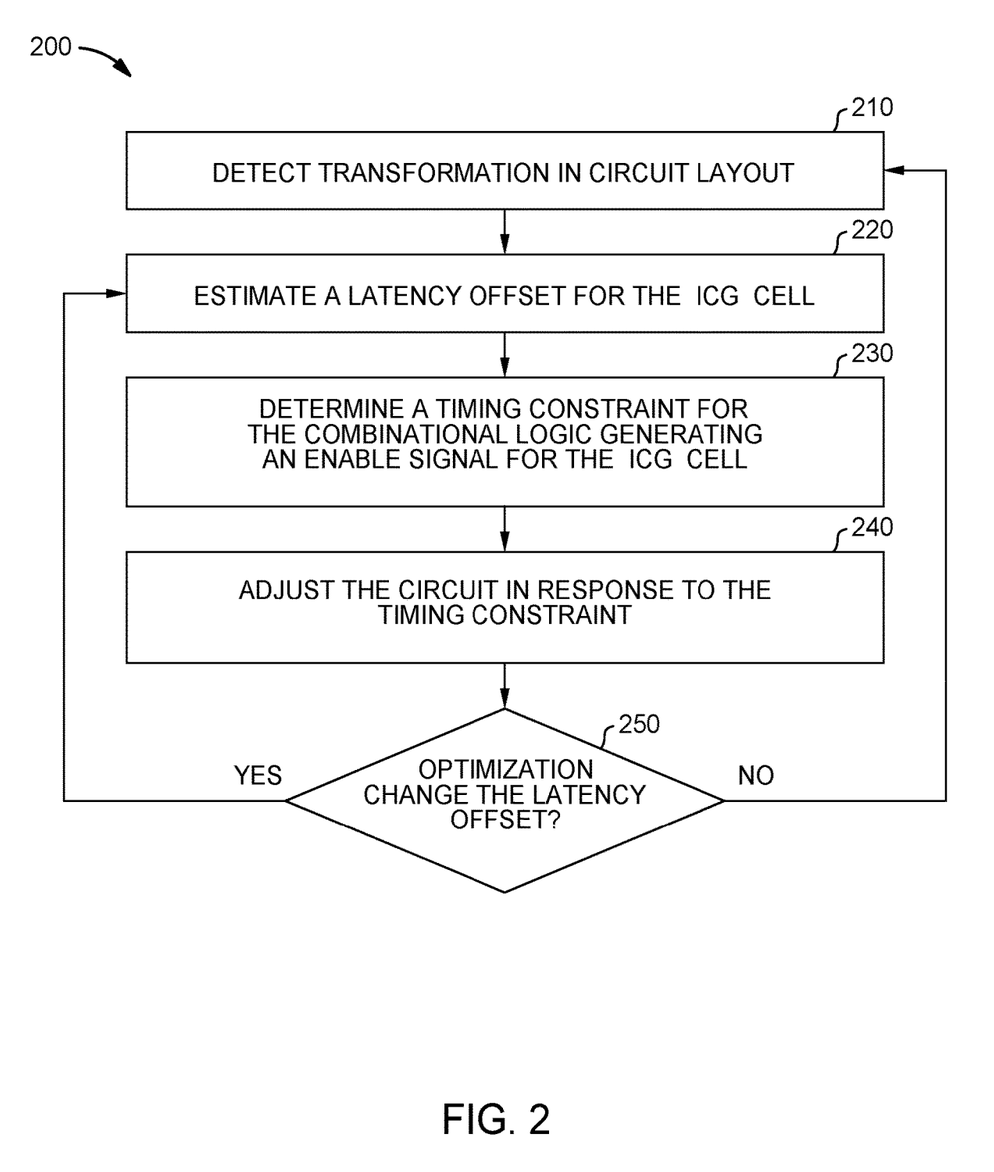
FIG. 2 is a flowchart of a method, for providing latency offsets in pre-CTS modeling, according to embodiments of the present disclosure.

FIG. 2 is a flowchart of a method 200, for providing latency offsets in pre-CTS modeling, according to embodiments of the present disclosure. For ease of explanation, the method 200 is discussed in parallel with FIGS. 3A-3C which illustrate subsequent circuit layouts 300a-c, according to embodiments of the present disclosure.

Method 200 begins at operation 210, where a design tool detects a transformation in a circuit layout design during pre-CTS optimization of the circuit (e.g., a circuit defined in a netlist) for one or more identified constraints. In one embodiment, the transformation is any transformation that affects a latency offset for an ICG cell in the circuit design. For example, during optimization of the circuit, the design tool may apply various transformations including, but not limited to: re-positioning a circuit element or cell, changing the composition of a cell (e.g., banking or de-banking one or more function into or out of a multi-bit cell, multi-bit (un)packing of flip flops, "useful-skewing", and clock gate cloning/splitting). These transformations can affect when the ICG cell (e.g., the ICG cell 130 in FIG. 1) receives a clock signal from a clock source (e.g., the CLK signal 180 from the clock 110 in FIG. 1).

However, the design tool may perform other transformations in the circuit layout that do not affect the latency offset for an ICG cell. As discussed below, these transformations may not trigger the method 200.

Figure 3A:
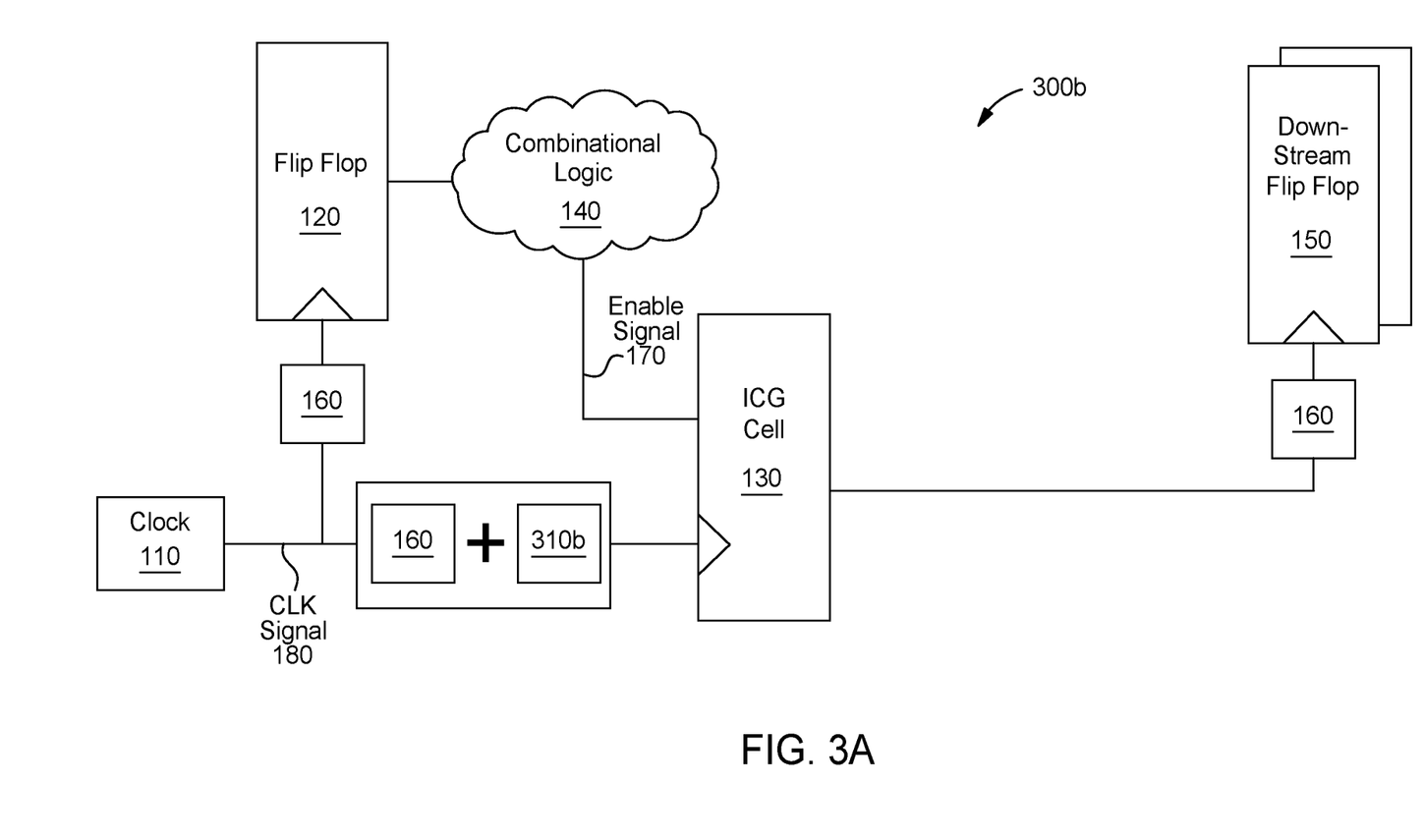
FIGS. 3A-3C illustrate subsequent circuit layouts based on the initial circuit layout of FIG. 1, according to embodiments of the present disclosure.
Figure 3B:
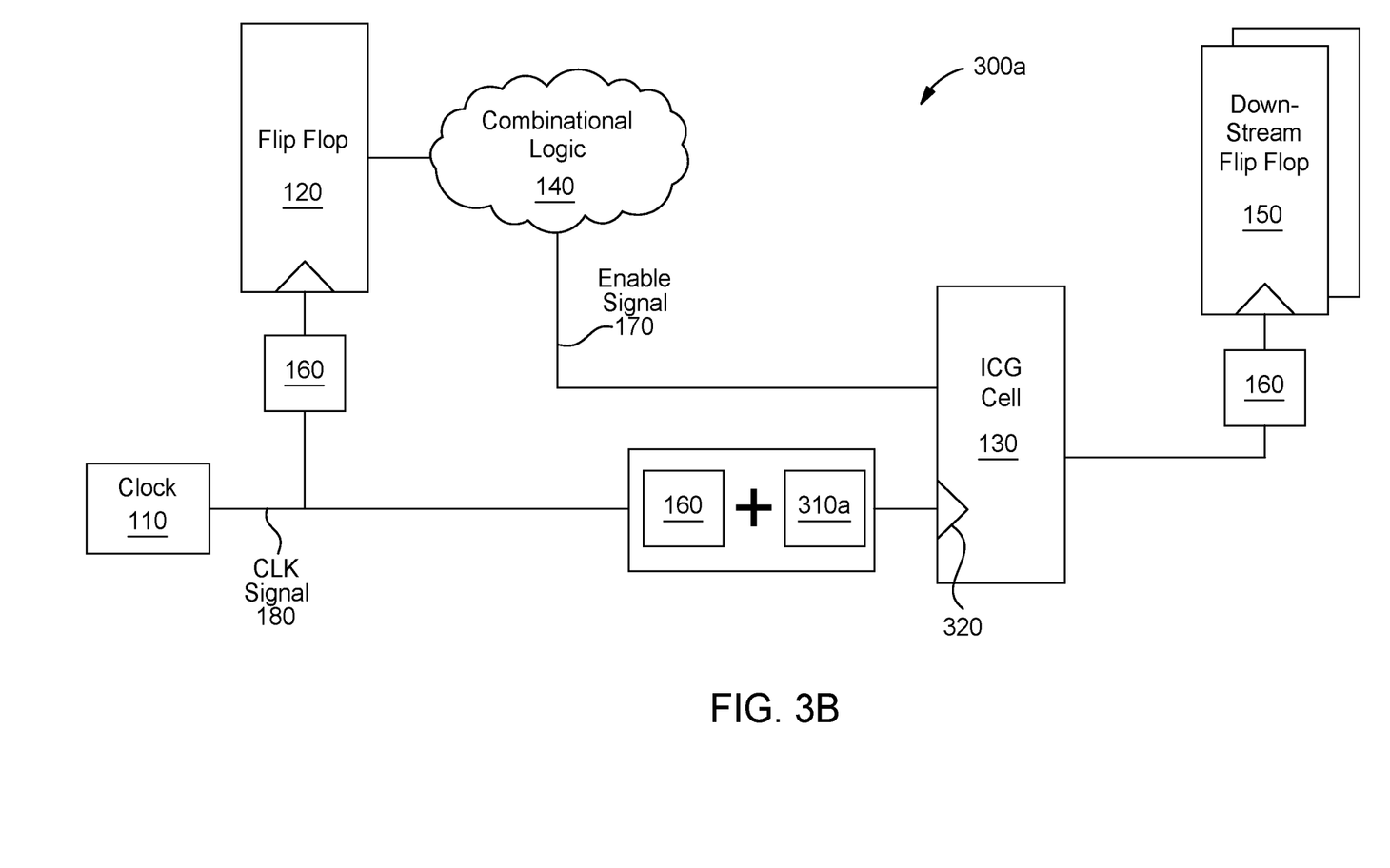
Figure 3C:
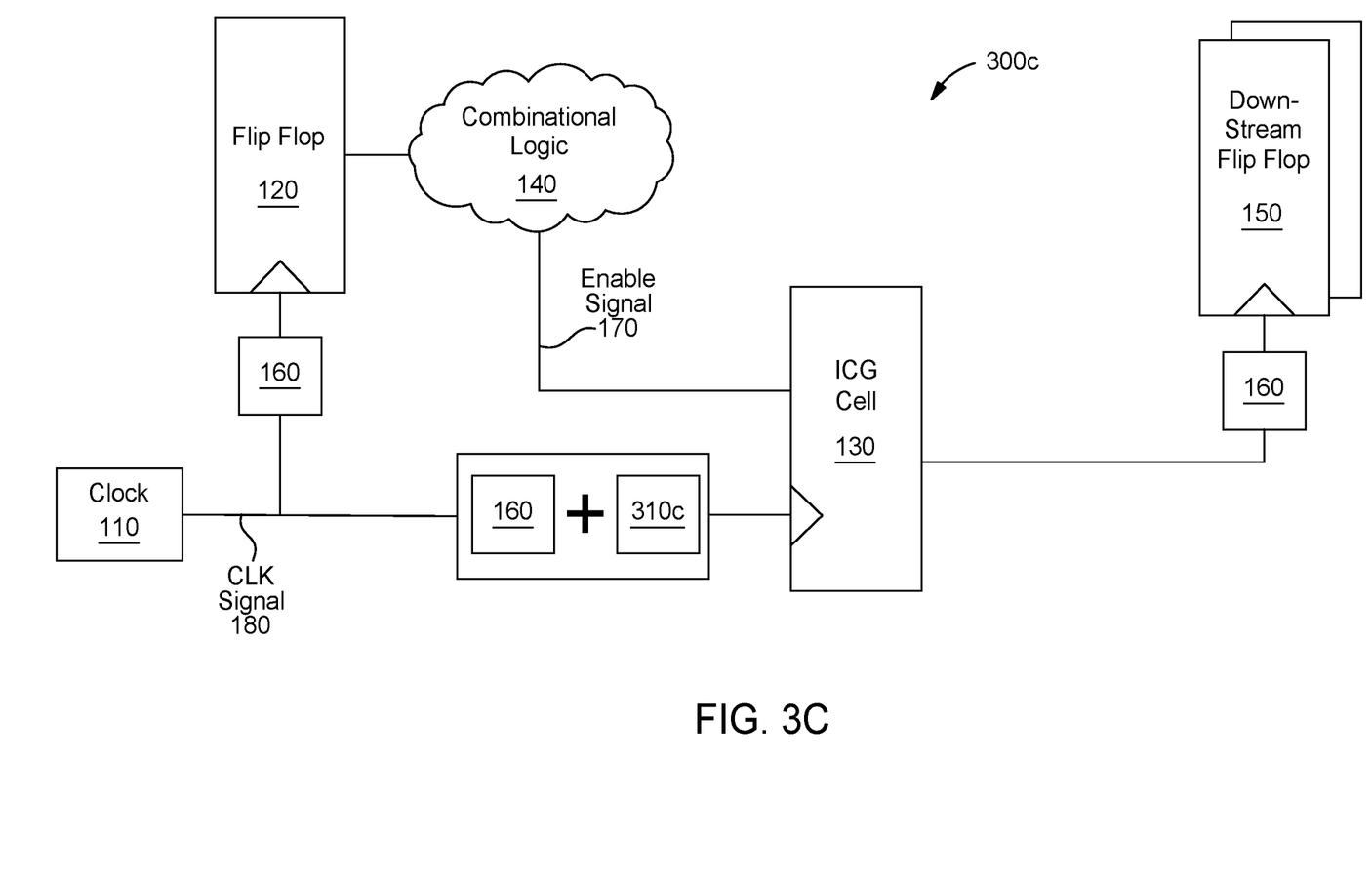

In response to detecting a transformation in the circuit layout that does affect the latency offset of an ICG cell, the method 200 proceeds to operation 220, where the design tool estimates a latency offset between the ICG cell and a clock. For example, the design can estimate a latency of the clock signal to the ICG cell and represent that as a latency offset to the global offset value 160. FIGS. 3A-3C illustrates this latency offset 310.

As shown in FIGS. 3A-3C, the design tool estimates various latency offsets 310a-c (generally or collectively, latency offsets 310) to the global latency value 160 (e.g., 100 ps for a clock signal to propagate from source to destination) as a mechanism to alter the effective latency to be used by the clock sink pins in evaluating the timing for various endpoints. The latency offset 310 is a floating value that is early/later and rise/fall specific, and as such can be positive or negative. For example, the design tool can estimate the total latency at the clock pin of the ICG cell 130 and then derive or estimate the latency offset 310 by subtracting the total latency from the global latency value 160. Thus, the latency for the clock pin 320 of the ICG cell 130 is represented by the combination of the latency offset 310 and the global latency value 160. In one embodiment, the latency offset 310 estimated on the clock pin 320 only affects the total latency of that specific pin and never propagates in the fanout cone of the clock output of the ICG cell 130. Stated differently, the latency offset 310 has a local effect on latency values and does not require propagation to evaluate the impact on timing on, e.g., the downstream flip-flops 150. Further, the latency offset 310 permits the design tool to model the timing degradation seen by the combinational logic 140 because of the latency offset 310 without impacting any other timing nets in the circuit (e.g., the latency 160 for the downstream flip-flops 150). That is, the latency offset 310 is only seen by the ICG cell 130 and can be used to optimize the combinational logic 140. Accordingly, analysis and estimation of the timing effects is faster and more computationally efficient to perform than CTS.

In the discussion below, it is assumed that the circuit design shown in FIG. 3A is a result of performing a transformation in the circuit layout as recited in operation 210 of the method 200 that affects the latency at the clock pin of the ICG cell 130. As an example, the transformation may have been a placement transformation that moved the ICG cell 130 from its position shown in FIG. 1 where it was closer to the downstream flip-flop 150 to its new position in FIG. 3A where the ICG cell 130 is now closer to the clock 110 and the flip-flop 120 in the layout. As mentioned above, the physical placement of the ICG cell 130 affects the latency between it and the connected circuit elements, e.g., the clock 110, the combinational logic 140, and the downstream flip-flop 150. Previously, pre-CTS stages assumed the latency seen by at the clock pin 320 is the global latency value 160 regardless of its position in the circuit layout. However, in the embodiments herein, the design tool measures or estimates the local latency offset 310a for the ICG cell 130 in response to the transformations. Again, changing the placement of the ICG cell 130 is just one example of a transformation that can affect the latency offset 310. Other transformations that can alter the offset 310 include changing a drive strength of a cell or changing the composition of a cell (e.g., banking or de-banking one or more function into or out of a multi-bit cell).

In one embodiment, the design tool uses a technique to estimate (or measure) the latency seen at the clock pin 320 of the ICG cell 130 which can then be used to derive the latency offset 310. Put differently, the design tool can estimate the latency offset 310 of the ICG cell 130 during a pre-CTS stage. Thus, while the clock pins for other elements in the circuit—e.g., the flip-flop 120 and the downstream flip-flop 150 are still assigned the global latency value 160—the design tool measures a more accurate latency for the ICG cell 130 relative to the clock 110—i.e., the combination of the global latency value 160 and the latency offset 310. For example, in FIG. 3A, the latency offset 310a may be −50 ps which can be added to the global latency value of 100 ps to result in a 50 ps latency for the clock pin 320 of the ICG cell 130.

At operation 230, the design tool determines, using the latency offset, a timing constraint for the combinational logic tasked with generating an enable signal for the ICG cell. For example, if the latency offset 310a in FIG. 3A is negative, this means there is less latency between the clock 110 and the ICG cell 130 than between the clock 110 and the flip flop 120. For ease of explanation, this disclosure assumes there is no internal delay in the flip-flop 120 which means the output signal of the flip-flop 120 reaches the combinational logic 140 after a delay defined by the global latency value 160. As such, because the latency offset 310a is negative, the CLK signal 180 reaches the ICG cell 130 sooner than the output of the flip-flop 120 reaches the combinational logic 140. In contrast, if the CLK signal 180 reaches the ICG cell 130 at the same time the output of the flip-flop 120 reaches the combinational logic 140, this means the combinational logic 140 has a full clock cycle to generate and stabilize the enable signal 170 so that the ICG cell 130 is then configured to either block, or pass, the CLK signal 180 on the next clock cycle. However, by estimating the latency offset 310 using the method 200, the design tool now knows the CLK signal 180 actually reaches the ICG cell 130 sooner that the output of the flip-flop 120 reaches the combinational logic 140 which is information typically not known until after CTS is performed. Thus, the design tool knows the combinational logic 140 has less than a full clock cycle to generate the enable signal.

In one embodiment, the timing constraint indicates a slack at the combinational logic 140. For example, a negative slack indicates the combinational logic 140 does not meet its timing budget. For instance, instead of having a full clock cycle (e.g., 1 nanosecond) to generate and stabilize the enable signal 170, due to the latency offset 310a in FIG. 3A, the combinational logic 140 may have only 0.95 nanoseconds due to the −50 ps latency offset 310a. Stated differently, the design tool can use the latency offset 310a to determine that the combinational logic 170 has negative slack and does not meet its timing budget.

In another example, the latency offset 310a may be positive which means it takes longer for the CLK signal 180 to reach the ICG cell 130 than the output of the flip-flop 120 to reach the combinational logic 140. In that case, the design tool can determine the combinational logic 140 has positive slack (e.g., more than a full clock cycle to generate the enable signal 170). The design tool can use the knowledge of the timing constraint (e.g., the slack of the combinational logic 140) to then optimize the circuit.

At operation 240, the design tool adjusts (or optimizes) the circuit in response to the timing constraint of the combinational logic 140 to change when the combinational logic 140 generates the enable signal. In various embodiments, the design tool continues an optimization flow by repositioning the circuitry in the layout. For example, a placer may attempt to position the flip flop 120, combinational logic 140, ICG cell 130, and/or the clock 110 so that the combinational logic 140 generates the enable signal 170 within the timing constraint (e.g., without having negative slack). In one embodiment, the design tool assumes signal strength for any signals transmitted by or received by the optimized circuit elements (and the associated input and output circuit elements) when repositioning the sequential logic elements, thereby omitting the need to update drive strengths or insert various buffers, amplifiers, or repeaters in the layout (in contrast to CTS). However, placement is just one type of parameter that can be performed at operation 240. As will be appreciated, in some iterations of the optimization flow, the design tool does not re-position the circuit elements and adjusts other parameters using different optimization steps (e.g., de-banking/re-banking logic elements or changing the useful skewing) in addition to, or instead of, re-positioning the logic elements.

At operation 250, the design tool determines whether the optimization(s) performed at operation 240 change the latency offset 310 of the ICG cell 130. If so, the method 200 returns to operation 220 where the latency offset is again estimated or measured and the method 200 repeats.

FIGS. 3A-3C provide an example of the method 200 repeating. In FIG. 3A, it is assumed the design tool has determined that the combinational logic 140 has negative slack due to the latency offset 310a. That is, because the ICG cell 130 was placed closer to the clock 110, this can result in the CLK 180 reaching the ICG cell 130 earlier. As a result, this may reduce the amount of time the combinational logic 140 has to generate the enable signal 170 as explained above.

At operation 240, the design tool can call a placer which determines to move the ICG cell 130 closer to the downstream flip-flop 150 as shown in FIG. 3B (e.g., shift the ICG cell 130 to the right relative to its position in FIG. 3A). That is, the change of the position of the ICG cell 130 in FIGS. 3A and 3B illustrates the placer optimizing the circuit in response to the timing constraint of the combinational logic 140—e.g., to reduce the negative slack.

In response, the method 200 returns to operation 220 where the design tool again measures the latency offset 310 of the ICG cell. In FIG. 3B, because the ICG cell 130 is shifted to the right, the latency offset 310b is either a less negative value than the latency offset 310a in FIG. 3A or may have a positive value. For example, the latency offset 310a may be −10 ps (or may be a positive offset). Thus, repositioning the ICG cell 130 changed the latency offset 310 from −50 ps to −10 ps.

At operation 230, the design tool can then re-determine the timing constraint for the combinational logic using the updated latency offset 310b. In this case, it is assumed the combinational logic 140 now has positive slack which means the logic 140 meets and exceeds its timing budget. That is, the combinational logic 140 can provide the enable signal 170 to the ICG cell 130 before it is needed to gate the CLK signal 180.

At operation 240, the design tool again optimizes the circuit in response to the timing constraint (e.g., the positive slack of the combinational logic 140). While shifting the ICG cell 130 to the right improved the slack on the combinational logic 140, it comes at a cost. Generally, it is desirable for a gating zone of a clock gate (i.e., the portion of the clock network gated or blocked by the clock gate) to be as large as possible. By shifting the ICG cell 130 to the right, the design tool has reduced the size of the gating zone of the ICG cell 130 which means the power savings from gating the CLK signal 180 using the ICG cell 130 is reduced.

Recognizing there is positive slack, the placer in the design tool can decide to shift the ICG cell 130 back to the left, but by a distance that is less than the distance the cell 130 was shifted to the right in the previous optimizing iteration. This is illustrated in FIG. 3C where the ICG cell 130 has been shifted to the left relative to the position of the ICG cell 130 in FIG. 3B but is still further to the right than the position of the ICG cell 130 in FIG. 3A. Doing so reduces the slack in the combinational logic 140 but it also improves power savings by increasing the gating zone of the ICG cell 130.

Because this optimization affects the latency offset, the method 200 again returns to operation 220 where the design tool measures the new latency offset 310c of the ICG cell 130 at the position shown in FIG. 3C. For example, the latency offset 310c may be −25 ps since the position of the ICG cell 130 in FIG. 3C is between the positions of the ICG cell 130 in FIGS. 3A and 3B wherein the latency offsets were −50 ps and −10 ps, respectively.

At operation 230, the design tool re-determines the timing constraint of the combinational logic 140. In this example, we can assume the slack of the combinational logic 140 is zero or slightly positive. At operation 240, the design tool may determine that no further optimizations should be performed. In the example above, the design tool balances the timing constraint of the combinational logic 140 with the power savings offered by the ICG cell 130 which results in an optimized solution. In other examples, the method 200 may repeat for a given set of sequential logic elements until an iteration threshold is reached or a computing time threshold is reached (e.g., a time-out).

At operation 250, the design tool may have determined that no further optimizations were performed, and thus the latency offset 310 was not changed in the previous optimization iteration. In that case, the method 200 proceeds instead to operation 210 where the optimization flow can continue. If the design tool performs another transformation that affects the latency offset of the ICG cell 130, this transformation again triggers the method 200 where the timing constraint of the combinational logic 140 can be balanced with other factors in the layout (e.g., the size of the gate zone of the ICG cell 130 or de-banking/re-banking logic elements) as discussed above. However, if, when executing the optimization flow, the design tool performs a transformation that does not affect the latency offset of the ICG cell, then the method 200 is not triggered.

Once the design tool moves to CTS in the optimization flow, then the method 200 can terminate. Thus, method 200 can ensure the timing constraints on the combinational logic 140 are satisfied during pre-CTS stages when there are more optimization techniques available to the design tool to optimize the circuit layout. When performing CTS, the design tool may evaluate and change the clocking network (e.g., the clock nets in the netlist represented by the circuit layouts in FIGS. 3A-3C) so that the clock signal 180 reaches the flip-flop 120 and the downstream flip-flop 150 at the same time. For example, the design tool may decide to add delay elements at the clocking pin of the flip flop 120. This may affect the timing constraint on the combinational logic 140, but it will be much easier for the design tool to optimize the circuit to ensure the combinational logic 140 provides the enable signal 170 in time to the ICG cell 130 since the bulk of this optimization was performed during the pre-CTS stages using the method 200.

While FIGS. 3A-3C illustrate shifting the placement of the ICG cell 130 to balance the slack of the combinational logic 140 with the gating zone of the ICG cell 130, this is just one example of the optimizations that can be performed. As will be appreciated, optimization is not limited to component placement, and several interactions are re-organizations and re-specifications of various elements in the circuit can be included with placement. For example, the design tool can perform de-banking/re-banking of logic in the layout to change the latency offset 310, and thus, change the slack of the combinational logic 140. Or the design tool may perform a combination of optimization techniques such as de-banking/re-banking logic elements as well as changing the placement of the ICG cell 130 to change the latency offset 310. In any case, at the end of each optimization iteration, different values of the latency offset 310 can be measured and used to model the estimated post-CTS clock timing for signal propagation.

Unlike CTS, the iterations performed for changing the latency offsets 310 in FIGS. 3A-3C are performed without inserting or placing buffers, amplifiers, or repeaters in the traces between clock-controlled elements, thus allowing for the timing estimation to be performed faster than CTS. Stated differently, during the iterative timing estimation operations, signal strength is assumed to be constant to avoid placing various signal conditioners to overcome line and device attenuation, which CTS checks for. Accordingly, by using signal propagation speed while assuming no signal degradation, the design tool can reposition various circuit elements to evaluate the timing effects of various latency offsets 310 on the combinational logic 140.

Figure 4:
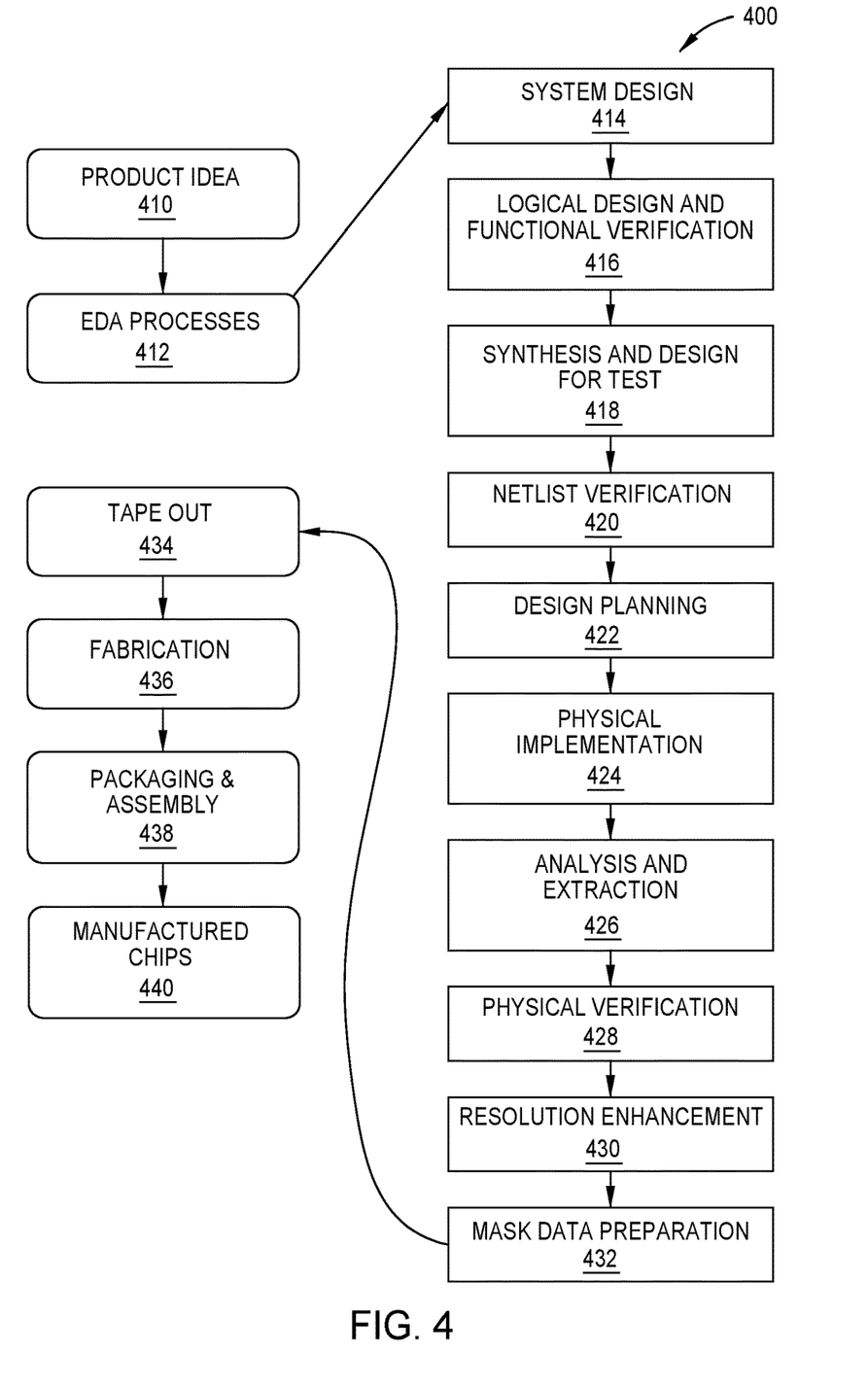
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level that is a less detailed description adds more useful detail into the design description, for example, more details for the modules that include the description. The lower levels of representation that are less detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 4. The processes described may be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
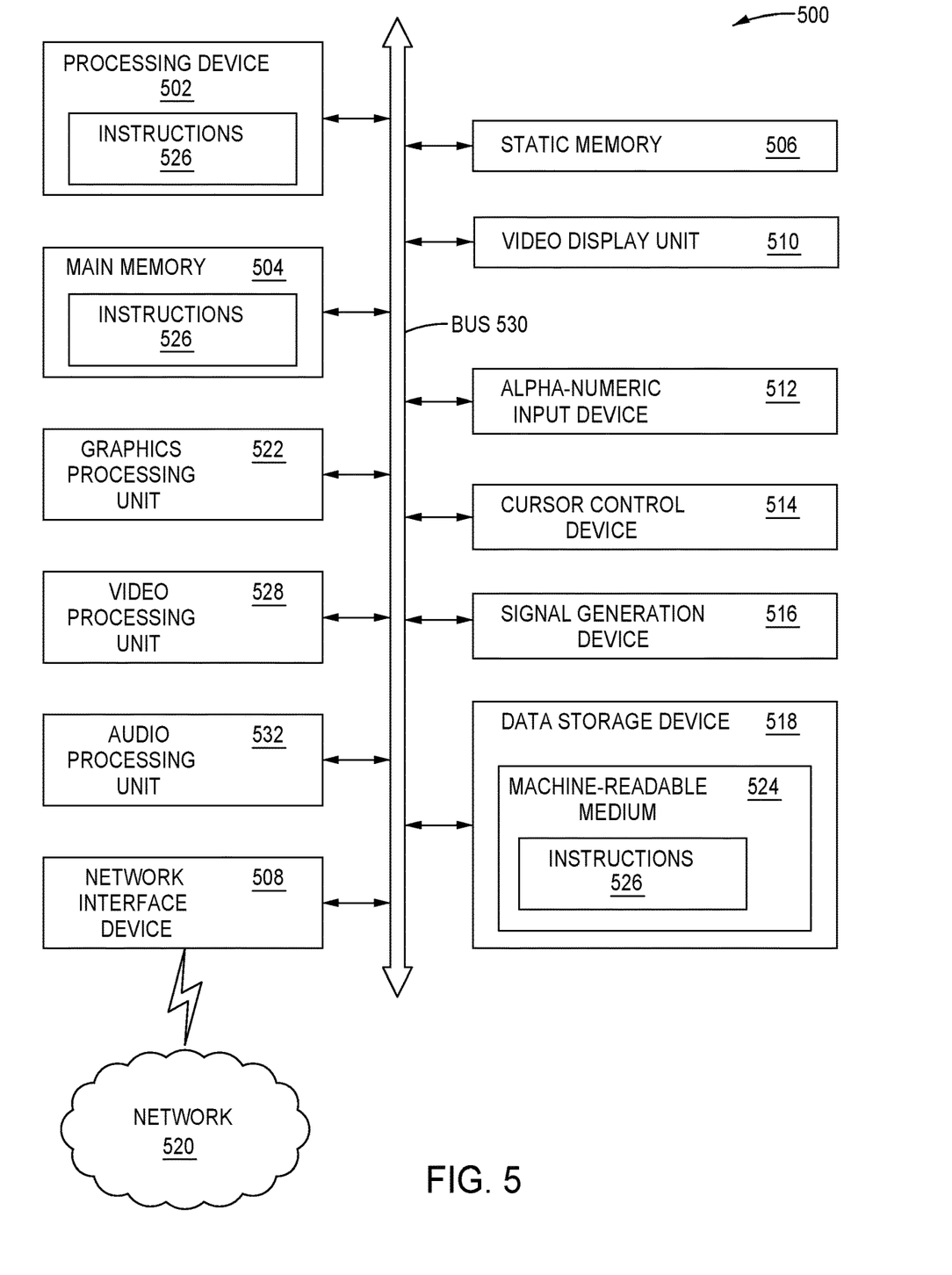
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   in response to detecting a transformation corresponding to a circuit layout before clock tree synthesis is performed, estimating a latency offset, relative to a global latency value, for a clock pin in a clock gate circuit, wherein the global latency value is applied globally in the circuit layout;
   determining, based on the latency offset, a timing constraint for combinational logic configured to generate an enable signal for the clock gate circuit; and
   adjusting a parameter of the circuit layout based on the timing constraint to affect when the combinational logic generates the enable signal.

2. The method of claim 1, wherein adjusting the parameter of the circuit layout changes when the combinational logic provides the enable signal to the clock gate circuit.

3. The method of claim 2, wherein adjusting the parameter of the circuit layout adjusts a slack of the combinational logic.

4. The method of claim 1, wherein the clock gate circuit is configured to, when deactivated by the enable signal, block a clock signal received at the clock pin from propagating to downstream logic in the circuit layout.

5. The method of claim 1, further comprising:
   after adjusting the parameter of the circuit layout, estimating an updated latency offset for the clock pin in the clock gate circuit;
   determining an updated timing constraint for the combinational logic based on the updated latency offset; and
   adjusting the parameter of the circuit layout based on the updated timing constraint to affect when the combinational logic generates the enable signal.

6. The method of claim 1, wherein adjusting the parameter of the circuit layout based on the timing constraint affects the latency offset but does not affect the global latency value at a clock pin of a first sequential element downstream from the clock gate circuit and does not affect the global latency value at a clock pin of a second sequential element upstream from the clock gate circuit.

7. The method of claim 6, wherein the combinational logic is arranged between the second sequential element and the clock gate circuit.

8. A system, comprising:
   a processor; and
   a memory containing a program which when executed by the processor performs an operation comprising:
   in response to detecting a transformation in a circuit layout before clock tree synthesis is performed, estimating a latency offset to a global latency value for a clock pin in a clock gate circuit, wherein the global latency value is applied globally to a plurality of sequential elements in the circuit layout;
   determining, based on the latency offset, a timing constraint for combinational logic configured to generate an enable signal for the clock gate circuit; and
   adjusting a parameter of the circuit layout based on the timing constraint.

9. The system of claim 8, wherein adjusting the parameter of the circuit layout changes when the combinational logic provides the enable signal to the clock gate circuit.

10. The system of claim 9, wherein adjusting the parameter of the circuit layout adjusts a slack of the combinational logic.

11. The system of claim 8, wherein the clock gate circuit is configured to, when deactivated by the enable signal, block a clock signal received at the clock pin from propagating to downstream logic in the circuit layout.

12. The system of claim 8, wherein the operation further comprises:
   after adjusting the parameter of the circuit layout, estimating an updated latency offset for the clock pin in the clock gate circuit;
   determining an updated timing constraint for the combinational logic based on the updated latency offset; and
   adjusting the parameter of the circuit layout based on the updated timing constraint to affect when the combinational logic generates the enable signal.

13. The system of claim 8, wherein adjusting the parameter of the circuit layout based on the timing constraint affects the latency offset but does not affect the global latency value at a clock pin of a first sequential element downstream from the clock gate circuit and does not affect the global latency value at a clock pin of a second sequential element upstream from the clock gate circuit.

14. The system of claim 13, wherein the combinational logic is arranged between the second sequential element and the clock gate circuit.

15. A non-transitory computer-readable storage medium having computer-readable program code embodied therewith, the computer-readable program code executable by a processor to perform an operation comprising:
   detecting, before clock tree synthesis is performed, a transformation corresponding to a circuit layout that affects a latency offset, relative to a global latency value, for a clock pin in a clock gate circuit, wherein the global latency value is applied globally in the circuit layout;
   measuring the latency offset for the clock pin in the clock gate circuit in response to detecting the transformation;
   determining, based on the latency offset, a timing constraint for combinational logic configured to generate an enable signal for the clock gate circuit; and
   adjusting a parameter of the circuit layout based on the timing constraint to affect when the combinational logic generates the enable signal.

16. The non-transitory computer-readable storage medium of claim 15, wherein adjusting the parameter of the circuit layout changes when the combinational logic provides the enable signal to the clock gate circuit.

17. The non-transitory computer-readable storage medium of claim 16, wherein adjusting the parameter of the circuit layout adjusts a slack of the combinational logic.

18. The non-transitory computer-readable storage medium of claim 15, wherein the clock gate circuit is configured to, when deactivated by the enable signal, block a clock signal received at the clock pin from propagating to downstream logic in the circuit layout.

19. The non-transitory computer-readable storage medium of claim 15, wherein the operation further comprises:
   after adjusting the parameter of the circuit layout, estimating an updated latency offset for the clock pin in the clock gate circuit;
   determining an updated timing constraint for the combinational logic based on the updated latency offset; and
   adjusting the parameter of the circuit layout based on the updated timing constraint to affect when the combinational logic generates the enable signal.

20. The non-transitory computer-readable storage medium of claim 15, wherein adjusting the parameter of the circuit layout based on the timing constraint affects the latency offset but does not affect the global latency value at a clock pin of a first sequential element downstream from the clock gate circuit and does not affect the global latency value at a clock pin of a second sequential element upstream from the clock gate circuit.

* * * * *